Figure 1:
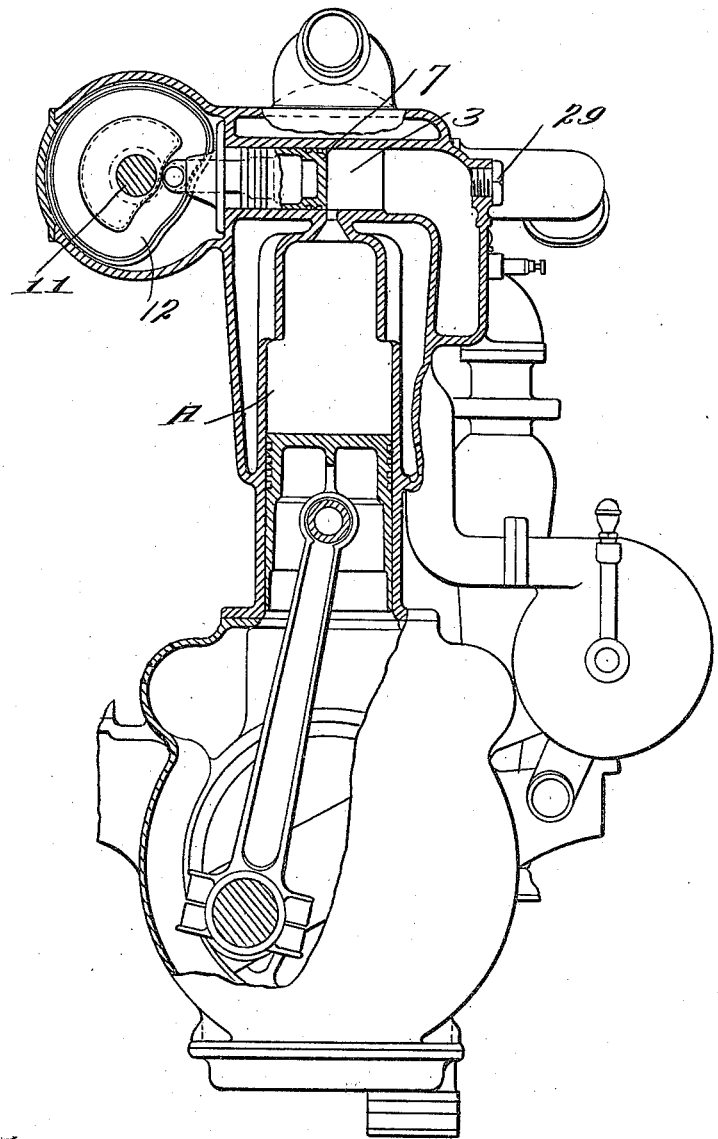

C. DE LUKACSEVICS.
INTERNAL COMBUSTION ENGINE.
APPLICATION FILED JAN. 12, 1912.

1,093,544.

Patented Apr. 14, 1914.
5 SHEETS—SHEET 1.

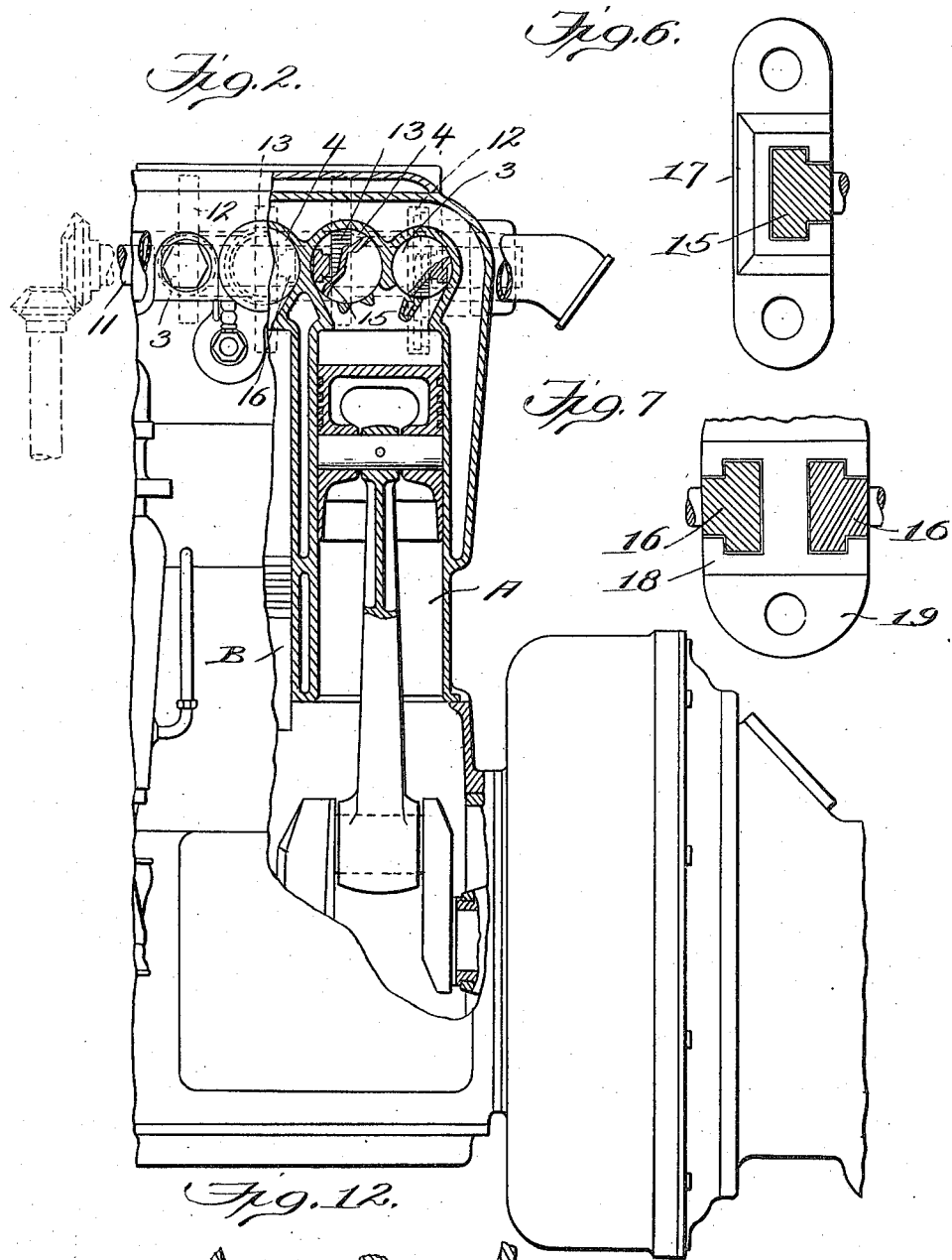

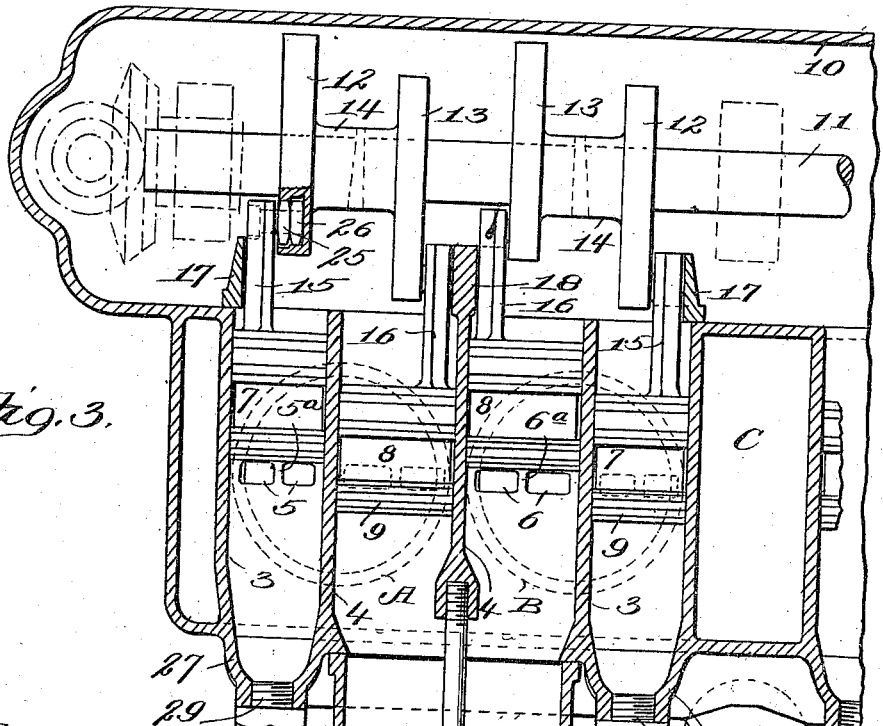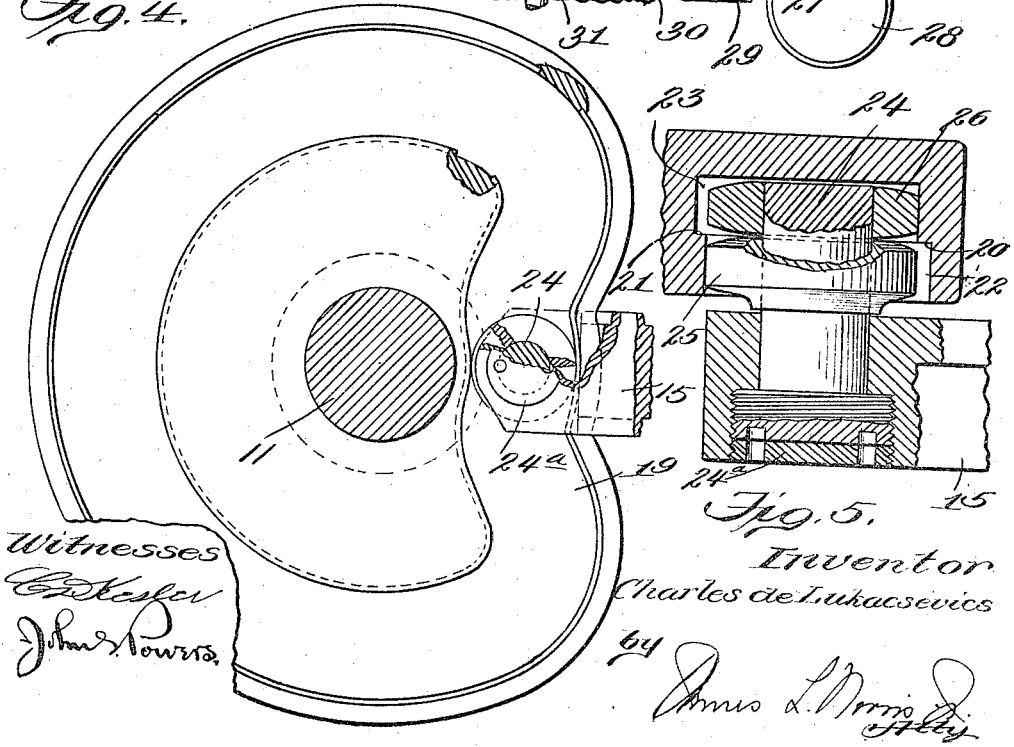

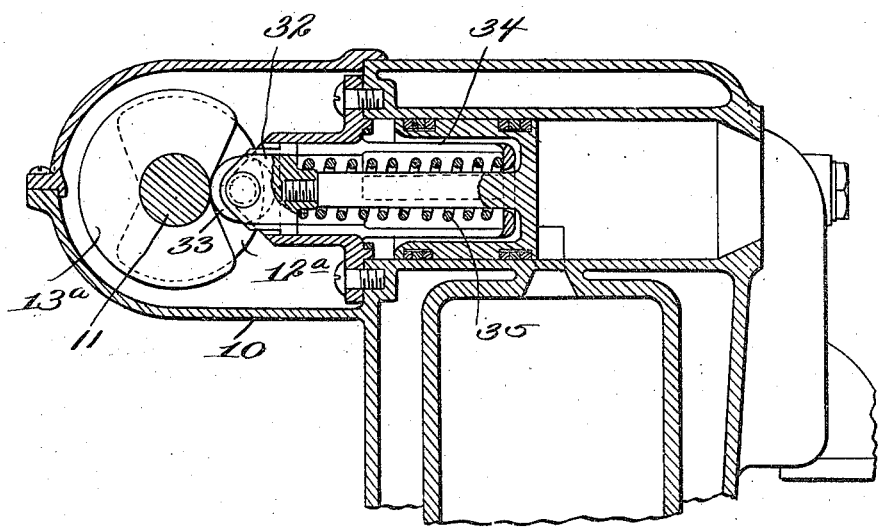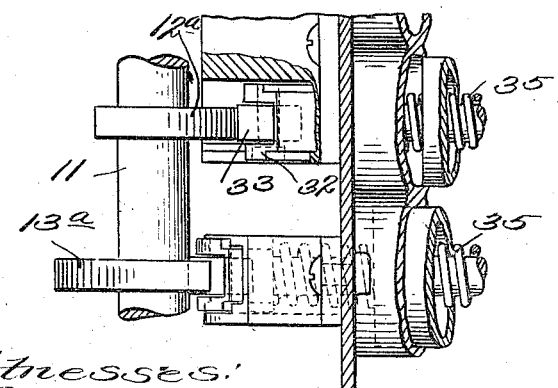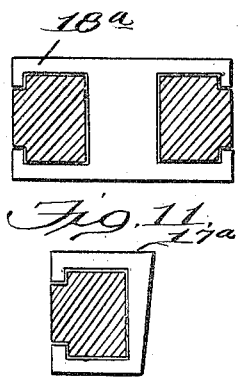

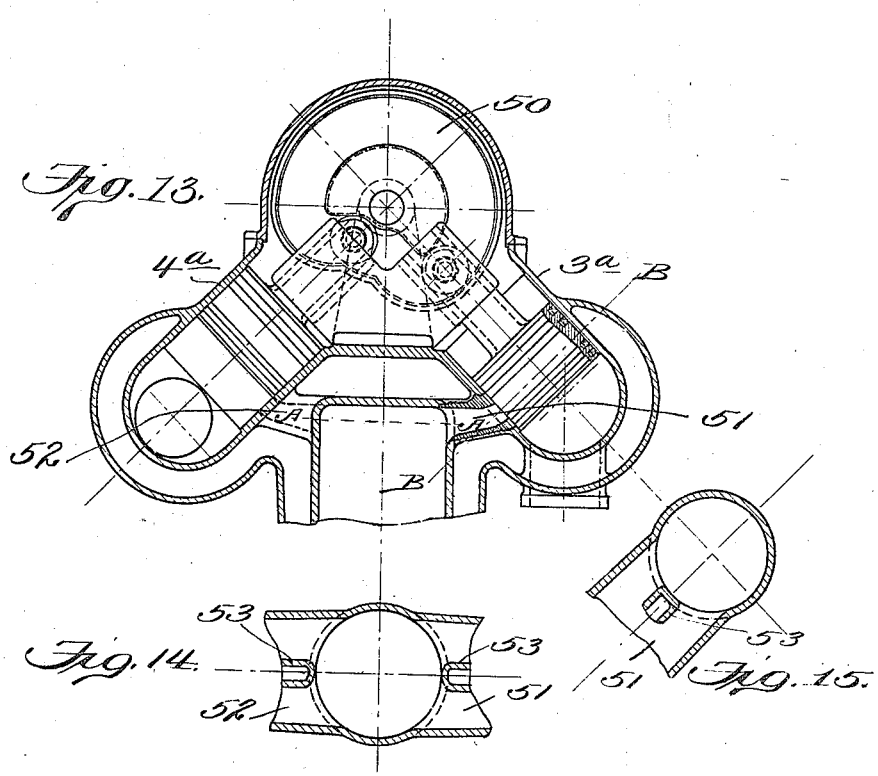

UNITED STATES PATENT OFFICE.

CHARLES DE LUKACSEVICS, OF WEST NUTLEY, NEW JERSEY, ASSIGNOR TO GEORGE W. MORGAN, JR., OF NEW YORK, N. Y.

INTERNAL-COMBUSTION ENGINE.

1,093,544.  Specification of Letters Patent.  Patented Apr. 14, 1914.

Application filed January 12, 1912. Serial No. 670,814.

*To all whom it may concern:*

Be it known that I, CHARLES DE LUKACSEVICS, a citizen of the United States, residing at West Nutley, in the county of Essex and State of New Jersey, have invented new and useful Improvements in Internal-Combustion Engines, of which the following is a specification.

This invention relates to improvements in internal combustion engines, and it has more particular reference to the valve mechanism thereof.

The invention comprehends piston valves for controlling the admission and exhaust, these valves being slidable in cylinders which are in communication with the several cylinders of the engine.

The principal object of the invention is to provide mechanism for the operation of valves of the type referred to which shall be substantially noiseless in its action, and in which loose play of the movable parts is prevented and wear reduced to a minimum.

A further object of the invention is to provide such an arrangement of parts as will enable the valves and their operating mechanism to be wholly inclosed and thus efficiently protected, but at the same time, readily accessible for the necessary purposes of substitution, cleaning, and repairs.

Other objects and advantages will appear as the description proceeds.

The invention is illustrated in the accompanying drawings, wherein:

Figure 1 is a view, partly in side elevation and partly in section, showing an engine in which the features of the present invention are incorporated, this figure showing also a preferred form of valve operating mechanism; Fig. 2 is a view, partly in elevation and partly in section, and in a plane at right angles to the plane of Fig. 1; Fig. 3 is a horizontal sectional view, showing the valves and their appurtenances; Fig. 4 is an enlarged detail view of the valve operating elements employed in the construction of Fig. 1; Fig. 5 is an enlarged sectional view, showing details of the construction of the elements shown in Fig. 4; Figs. 6 and 7 are detail views showing the bearings for the valve rods; Fig. 8 is a detail vertical view in the same plane as Fig. 1, showing a modification of the valve operating mechanism; Fig. 9 is a detail plan view, partly in section, showing the valve operating elements employed in the construction of Fig. 8; Figs. 10 and 11 are detail sectional views showing the bearings for the valve rods in the construction shown in Fig. 8; Fig. 12 is an enlarged detail sectional view showing the water jacketed "webs" in the valve chambers; Fig. 13 is a sectional view illustrating an alternative arrangement of the valve chambers; and Figs. 14 and 15 are detail sectional views on the lines A and B respectively of Fig. 13.

Similar characters of reference designate corresponding parts throughout the several views.

The engine illustrated is of the four cycle type. In the drawings, however, I have shown the features of the present invention only in relation to two of the cylinders, it being unnecessary to show the engine in its entirety, as the arrangement is duplicated for the other two cylinders.

In Fig. 3, two of the cylinders at one end of the engine are indicated in dotted lines, being designated by the letters A and B respectively. Adjacent the cylinder B is a hollow mid-wall C which is also constructed to serve as a part of the water jacket and which forms a division between the cylinders A and B at one end of the engine, and the other two cylinders at the other end of the engine. At the upper ends of each cylinder A and B, horizontal and parallel cylindrical valve chests are provided, the inlet valve chest being indicated by the numeral 3 and the exhaust valve chest by the numeral 4. In the arrangement shown, the exhaust valve chests of the cylinders A and B have a mean relation, while the inlet valve chests of the same cylinders have an extreme relation. The valve chests 3 and 4 communicate with the respective cylinders with which they are associated through ports 5 and 6 respectively. By preference, a plurality of ports is provided for each valve chest, the ports being thus separated from one another by webs, as 5ª and 6ª respectively. The inlet valves are designated by the numeral 7 and the exhaust valves by the numeral 8. The valves 7 and 8 slide axially of the respective cylinders 3 and 4, and have a gas-tight fit in these cylinders, this being assured by the use of suitable packing rings 9. By providing a plurality of openings 5 and 6 for the respective valve chests 3 and 4, adequate communication between said valve chests and the cylinders with which they are associated is secured, while, at the same time, the webs 5ª and 6ª between the openings in each valve chest serve to hold the packing rings 9 in proper relation as they move with the valves across said openings; said webs are preferably hollow for the purpose of water circulation, as shown in Figs. 2 and 12. The cylinders 3 and 4, throughout the extent of the engine, are in communication at corresponding ends with a longitudinal casing 10, which incloses a longitudinal valve operating shaft 11. This shaft is driven by a suitable two-to-one gearing, e. g., bevel gearing, from the crank shaft of the engine, and is provided with cams 12 and 13 which correspond to the respective inlet and exhaust valves 7 and 8; that is to say, for each valve 7 there is a cam 12, and for each valve 8 there is a cam 13.

As a matter of convenience, the cams 12 and 13 for each pair of associated valves 7 and 8 are integrally constructed being connected by a sleeve 14 which surrounds the shaft 11 and is suitably connected thereto as by a cone pin. The valves 7 and 8 are provided with axially disposed rods 15 and 16 respectively, which project into the casing 10 and which carry rollers that engage the cams 12 and 13. The rods 15 and 16 are arranged in a common horizontal plane, but at relatively opposite sides of the associated valves 7 and 8, and the rods 16 of the valves 8 have a relatively close association. These rods have a T-shaped cross section, the rods 15 working in guides 17 and the rods 16 working in guides 18. Owing to the close association of the rods 16, the guides 18 may be formed integrally in adjoining relation, and provided with common attachment lugs 19 which are bolted to the intermediate wall that is common to the two chests 4. The guides 17 are secured in like manner to the outer walls of the chests 3. In this connection, it should be noted that said guides 17 and 18 are secured to the end faces of the walls referred to and are formed throughout their length with horizontally extending T-shaped slots through which the rods 15 and 16 work. The association of said rods with said guides in the manner indicated assures of the valves having true axial movements, and having their movements without loose play and consequent undue wear. The cams 12 and 13 are similarly constructed, so that a description of one cam will suffice for all. Each valve operating cam has a cam groove 19 in one of its side faces, and said groove has an external shoulder 20 adjacent its periphery and an internal shoulder 21 located inwardly of the shoulder 20 and concentric to the latter. The shoulders 20 and 21 thus divide the grooves 19 into ways 22 and 23, which ways are disposed in parallel planes and have the same direction, but are so related that the outer and inner faces of the way 22 are nearer to the periphery of the cam than the outer and inner faces of the way 23. Each valve rod 15 and 16 carries at its outer end a laterally projecting stud 24, secured in position by a lock nut or disk 24ª. The stud 24 extends into the groove 19 and carries two rollers 25 and 26.

The rollers 25 and 26 are disposed in parallel planes, the roller 25 operating in the way 22 and the roller 26 operating in the way 23. These rollers are of uniform diameter and of such extent that they will contact with the respective inner and outer faces of the ways 22 and 23; that is to say, owing to the offset relation of these ways, the roller 25 will contact with the inner face of the way 22, and the roller 26 will contact with the outer face of the way 23. This relation of the rollers 25 and 26 and the ways 22 and 23 obtains the same effect in so far as the security of engagement is concerned that would be obtained by the employment of a single roller fitting tightly in a vertical cam groove, but it eliminates the great degree of friction which would be generated consequent to the operation of a tightly fitting roller in an ordinary cam groove.

The inlet chests 3 are in communication at their ends opposite to the casing 10 with an inlet manifold 27, which is provided with a carbureter connection 28, and which, of course, has branches extending to said chests, these branches being equipped with removable screw plugs 29 located axially with respect to the valve chests 3, and enabling ready access to the interior of said chests at one side of the engine when the occasion so requires. The chests 4 at their ends offset to the casing 10, communicate with an exhaust manifold 30 which may be secured in position in any suitable manner, for example, by a bolt 31 which is threaded into the common dividing wall between the chests 4. The casing 10 may be made in sections, which may be readily dissociated to enable access to the interior of said casing and to the valve appurtenances contained therein.

By forming the groove 19 with offset ways 22 and 23, and by using a pair of rollers which work in said respective ways in the manner explained, a very positive, noiseless, frictionless, action of the valve operating cams is secured. The relation of the valve rods to their guides is such as to positively prevent any side play of any character of said valve rods, and to thereby insure that the operation of the rollers 25 and 26 and also of the valves 7 and 8 shall be without any binding loose play or undue friction.

In the construction shown in Fig. 8, the chests 3 and 4 have the same relation that they do in the construction above described, opening into the casing 10 at one side of the engine and to the inlet and exhaust manifolds at the opposite side of the engine. The valve operating cams in this case are designated by the characters 12ª and 13ª respectively, the cams 12ª being provided for the inlet valves and the cams 13ª for the exhaust valves. The valve rods in this construction are arranged centrally and axially of the valves, and carry at their outer ends heads 32 which have a T-shaped cross section and which work in guides 17ª and 18ª, generally similar to the respective guides 17 and 18 previously referred to. The heads 32 are each formed with a fork, between the arms of which a friction roller 33 is arranged, the rollers 33 engaging the peripheral faces of the cams 12ª and 13ª. In this connection, the valves are cupped to accommodate spider frames 34 which are secured in the ends of the several valve chests adjacent the casing 10, and which afford seats for the inner ends of expansive coil springs 35, the outer ends of said springs seating against the heads 32 and thereby tending to move the valves inwardly and to constantly hold the rollers 33 in contacting relation to the cams 12ª and 13ª.

In the modified construction, just as in the previous construction, the valve rods are positively guided and provision is made for insuring the security of the engagement between the rollers carried by said valve rods and the valve operating cams. In the modified construction, however, the action of the valves is not so positive as in the arrangement first described.

Fig. 13 illustrates a construction wherein the valve operating cams and their adjuncts are of the form shown in Figs. 4 and 5, but wherein the companion inlet and exhaust valve cylinders 3ª and 4ª are arranged at angles of 90 degrees to one another, and 45 degrees to the axis of the cylinder. By virtue of this arrangement, one cam, as 50, arranged intermediate the valve chests, may serve the place of the two cams 12 and 13 shown in Fig. 2. As shown, the cam 50 is of the same construction as either of the cams 12 and 13, except that instead of having an offset cam groove merely on one face, it has such a groove on both faces. The cam 50, as will be readily apparent, operates the companion inlet and exhaust valve in proper relation, and in accordance with the sequence of a four cycle engine. Aside from this advantage, the arrangement shown in Fig. 13 enables the use of relatively large inlet and exhaust passages 51 and 52 respectively, and of relatively large piston valves to control the same. The inlet and exhaust passages inclose tubular webs or bridges 53 which may be hollow for the purpose of water circulation, and not only serve to prevent displacement of the piston packing into the ports, but also to brace the upper head of the cylinder and thereby eliminate any weakness which might otherwise result from having inlet and exhaust ports of such relatively great extent. Aside from the features referred to, the construction shown in Fig. 13 may be otherwise similar to the construction shown in Figs. 1 and 2.

Having fully described my invention, I claim:

1. In an internal combustion engine, the combination with a cylinder thereof, of inlet and exhaust valve chests communicating with said cylinder, a casing communicating with corresponding ends of said chests, valves slidable axially of the respective chests and having axially disposed rods rigid therewith and which extend into said casing, guides secured at the ends of the chests and through which the rods work, the guides being disposed in the casing, a shaft extending through the casing, valve operating cams on the shaft, and rollers carried by the valve rods for engagement with the cams.

2. In an internal combustion engine, the combination with a cylinder thereof, of inlet and exhaust valve chests communicating with said cylinder, a casing communicating with corresponding ends of said chests, valves slidable axially of the respective chests and having axially disposed rods which extend into said casing and have a T-shaped cross section, guides secured at the ends of the chests and through which the rods work, the guides conformably fitting over the rods, and being disposed in the casing, a shaft extending through the casing, valve operating cams on the shaft, and rollers carried by the valve rods for engagement with the cams.

3. In an internal combustion engine, the combination with a cylinder thereof, of inlet and exhaust valve chests communicating with said cylinder, a casing communicating with corresponding ends of said chests, valves slidable axially of the respective chests and having axially disposed rods which extend into said casing, guides secured at the ends of the chests and through which the rods work, the guides being disposed in the casing, a shaft extending through the casing, valve operating cams on the shaft, each cam having a cam groove in a side face provided with offset ways of the same direction and extent, and a pair of rollers carried by each valve rod, one roller contacting only with one face of one of the cam ways and the other roller contacting with the opposite face of the other cam way.

4. In an internal combustion engine, the combination with a cylinder thereof, of inlet and exhaust valve chests communicating with said cylinder, a valve operating shaft, valves slidable axially of the respective chests and having axially disposed rods, cams mounted on said valve operating shaft, each cam having a cam groove in a side face provided with offset ways of the same direction and extent, and a pair of rollers carried by each valve rod, one roller contacting only with one face of one of the cam ways and the other roller contacting with the opposite face of the other cam way.

5. In an internal combustion engine, the combination with the cylinders thereof, of an exhaust valve chest and an inlet valve chest for each cylinder, the valve chests extending in diverging relation toward the cylinder and being related to one another at an angle of ninety degrees and to the axis of the cylinder at an angle of forty-five degrees, piston valves operating in said respective chests, and a cam producing the operation of said valves and being common thereto, the cam being arranged intermediate the chests, substantially as set forth.

In testimony whereof I have hereunto set my hand in presence of two subscribing witnesses.

CHARLES DE LUKACSEVICS.

Witnesses:
A. L. HUNTLEY,
PHILIP WOHLSTETTER.

---

Copies of this patent may be obtained for five cents each, by addressing the "Commissioner of Patents, Washington, D. C."